United States Patent

Engel

[11] 3,966,503
[45] June 29, 1976

[54] METHOD FOR MAKING INSTANTANEOUS SCARFING STARTS

[75] Inventor: Stephen August Engel, Shenorock, N.Y.

[73] Assignee: Union Carbide Corporation, New York, N.Y.

[22] Filed: Jan. 13, 1975

[21] Appl. No.: 540,455

[52] U.S. Cl. .............................................. 148/9.5
[51] Int. Cl.² ........................................ B23K 7/08
[58] Field of Search ..................... 148/9 C, 9.5, 9 R

[56] References Cited
UNITED STATES PATENTS

| | | | |
|---|---|---|---|
| 2,309,096 | 1/1943 | Bucknam et al. | 148/9 C |
| 2,438,344 | 3/1948 | Meincke | 148/9 C |
| 3,658,599 | 4/1972 | Svensson et al. | 148/9.5 |

FOREIGN PATENTS OR APPLICATIONS

| | | |
|---|---|---|
| 4,134/74 | 1/1975 | Brazil |
| 7,307,144-1 | 1/1975 | Sweden |

*Primary Examiner*—W. Stallard
*Attorney, Agent, or Firm*—Lawrence G. Kastriner

[57] ABSTRACT

A method for making an instantaneous thermochemical start on the surface of a ferrous metal workpiece, comprising the steps of: (a) contacting a preselected spot on said surface where the reaction is to begin, with the end of a ferrous metal wire which has been heated to its ignition temperature in an oxygen atmosphere, (b) impinging a high intensity jet of oxygen gas on said surface at a point 1 to 15 cm. behind said spot, thereby causing an immediate scarfing reaction to begin and a molten puddle to form at said spot, and (c) continuing the impingement of a high intensity jet of oxygen on said puddle until the puddle has spread to a preselected width. Thereafter, the spreading oxygen stream may be left on and used to carry out the scarfing reaction, or it may be turned off and another oxygen stream may be impinged on the spread puddle at an acute angle to the work surface in order to "take over" and carry out the scarfing reaction. The type of scarfing cut sought will determine the type of scarfing oxygen stream used to "take over" the scarfing reaction from the spreading stream.

14 Claims, 11 Drawing Figures

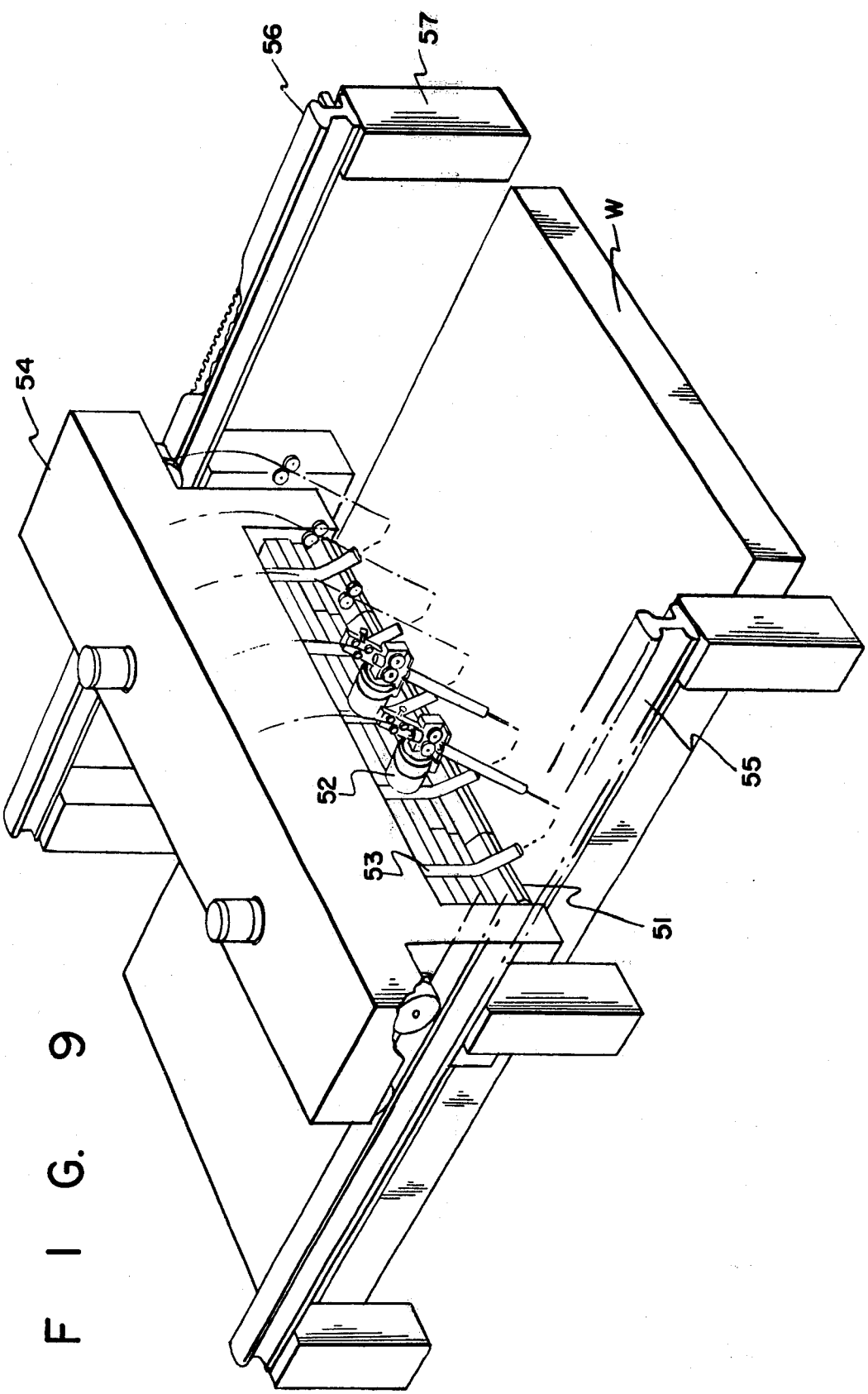

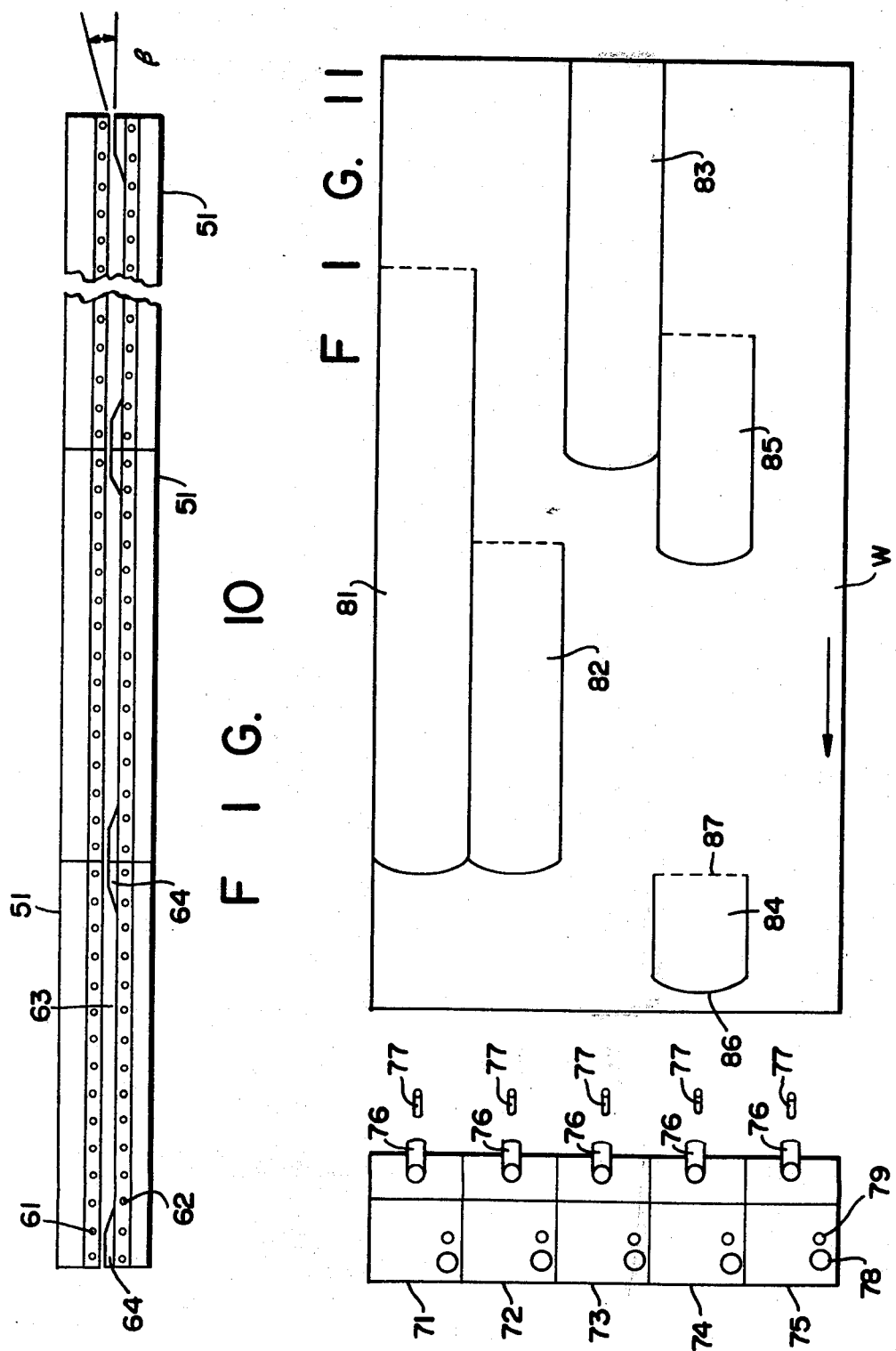

METHOD FOR MAKING INSTANTANEOUS SCARFING STARTS

BACKGROUND

This invention relates, in general, to thermochemical removal of metal from the surface of a workpiece, commonly called scarfing. More particularly, it relates to the making of instantaneous or "flying starts" for scarfing operations. A "flying start", as that term is used throughout the present specification and claims, means the virtually instantaneous starting of a thermochemical reaction on a workpiece which is moving relative to the scarfing machine at its normal scarfing speed, i.e. a speed of from about 6 to 45 meters per minute. The lower end of said range being used for scarfing cold workpieces and the upper end for scarfing hot workpieces.

It is well known in the art that a scarfing reaction is started by preheating the metal workpiece to its molten or ignition temperature — normally by preheating flames directed on to a relatively small area — before applying an obliquely directed stream of high velocity scarfing oxygen at the molten puddle. The scarfing oxygen stream has a two-fold purpose, first to effect a thermochemical reaction with the metal, and second to blow away the reacted metal, thereby exposing fresh metal for the scarfing reaction.

Metal rods have long been used to obtain faster starts in hand scarfing operations, as shown for example by U.S. Pat. No. 2,205,890. Here the work must be stationary, and the operator, by his individual skill, must be able to manipulate both the timing of the scarfing oxygen stream, as well as the angle of the torch and rod. Starting of mechanized scarfing reactions with wire rods is likewise known, as shown by Bucknam et al. in U.S. Pat. No. 2,309,096. Scarfing starts described therein are, however, likewise possible only on stationary workpieces.

Although flying starts are known in the art, making them has only been feasible with complicated, expensive and unreliable processes. As a result, they have met with very little commercial success. Flying starts made with the aid of metal powder are disclosed by DeVries et al. in U.S. Pat. No. 3,216,876, and those made by use of an energized electrode are disclosed by Lobosco in U.S. Pat. No. 2,513,425 and by Svensson et al. in U.S. Pat. No. 3,658,599. Rapid wear of the powder conveying equipment cause powder starts to be unreliable, and this fact plus the cost of the metal powder render powder starts unsatisfactory. The problems associated with electrically powered starts are their expense and relative complexity.

It has not been possible prior to the present invention to make a truly instantaneous or flying start on a moving workpiece without the use of metal powder or an electrically energized metal rod or ceramic electrode.

OBJECTS

It is an object of this invention to provide a simple, inexpensive and reliable process which is capable of making an instantaneous or flying start on a workpiece without the use of metal powder or electric power.

It is another object of this invention to provide a process capable of making an instantaneous, individual, fin-free spot scarfing cut on a metal workpiece without the use of metal powder or electric power.

It is still another object of this invention to provide a process capable of making — in a single pass over the surface of the workpiece — a plurality of instantaneously started, randomly located, selective scarfing cuts on the surface of a workpiece moving at normal scarfing speed.

It is yet another object of this invention to provide a process capable of making an instantaneously started full width scarfing cut on the surface of a workpiece moving at normal scarfing speed.

SUMMARY OF THE INVENTION

These and other objects which will become apparent to those skilled in the art are achieved by the present invention which consists of a method for making an instantaneous thermochemical start on the surface of a ferrous metal workpiece, comprising the steps of:

a. contacting a preselected spot on said surface where the reaction is to begin, with the end of a ferrous metal wire which has been heated to its ignition temperature in an oxygen atmosphere, b. impinging a high intensity jet of oxygen gas on said surface at a point 1 to 15 cm. behind said spot, thereby causing an immediate scarfing reaction to begin and a molten puddle to form at said spot, and c. continuing the impingement of a high intensity jet of oxygen on said puddle until said puddle has spread to a preselected width.

The term "instantaneous" as used with reference to making a thermochemical start, in the present specification and claims, is meant to include "flying starts", as well as starts where there is no relative motion between the workpiece and the scarfing apparatus until the instant contact is made between the hot wire and the preselected spot. At the instant of contact, however, normal scarfing speed is immediately commenced (without waiting for puddle formation as in the prior art) so that the starting process is carried out with relative motion between the workpiece and the scarfing apparatus. If motion is not immediately commenced on contact of the hot wire, the oxygen jet would gouge a hole in the workpiece within a very short time. The relative motion may, of course, be caused by moving either the work surface relative to stationary scarfing apparatus or vice versa.

After the molten puddle has been spread to its preselected width, the instantaneous start has been completed. The spreading oxygen stream may then be left on and used to carry out the scarfing reaction, or it may be turned off and another oxygen stream may be impinged on the spread puddle at an acute angle to the work surface in order to "take over" and carry out the scarfing reaction. The type of scarfing cut sought will determine the type of scarfing oxygen stream used to "take over" the scarfing reaction from the spreading stream.

An individual, fin-free, spot scarfing cut can be made by discharging at the puddle, an oblique, sheet-like stream of scarfing oxygen gas whose intensity of flow is gradually diminished towards the edges of the stream, reaching zero intensity at the lateral edges of the nozzle orifice from which it is discharged, and which produces a cut which is narrower than the width of said orifice. Such a scarfing cut can be made with the nozzles described and claimed in my copending U.S. Pat. application Ser. No. 607,888 filed Aug. 26, 1975, the entire disclosure of which is incorporated herein by reference.

If selective spot scarfing of the entire surface of a workpiece is sought to be done in a single pass, the scarfing cuts must be made not only fin-free, but also in such manner that adjacent cuts will neither overlap nor leave excessively high ridges or deep grooves between them. This requires the capability for discharging at the puddle abutting side-by-side scarfing oxygen streams each of whose intensity of flow diminishes gradually towards its edges and each of which produces a scarfing cut which is at least as wide as its discharge orifice. Nozzles for making such scarfing cuts are described and claimed in my copending U.S. Pat. application Ser. No. 607,887 filed Aug. 26, 1975, the entire disclosure of which is incorporated herein by reference. As these scarfing units pass over the workpiece at normal scarfing speed they can be turned on and off in a preselected manner to scarf out any random pattern of defects located on the surface of the workpiece.

If a conventional scarfing pass is sought to be made, this can be done by directing an oblique sheet-like stream of scarfing oxygen at the puddle from a conventional rectangularly shaped nozzle whose intensity of flow is substantially uniform across its entire width. In such case the instantaneous scarfing start provides the benefit of being able to start the scarfing reaction on a workpiece as it comes into register with the scarfing units without having to slow down or stop either the workpiece or the units in order to start the scarfing reaction, as is required when using conventional preheating flames. The instantaneous start permits the scarfing operation to begin immediately upon contact of the apparatus with the workpiece.

THE DRAWINGS

FIG. 9 illustrates in perspective view, another preferred embodiment of the present invention, namely, a plurality of adjacent scarfing units for performing instantaneously started selective, multi-cut, single pass, spot scarfing of the full width of a workpiece.

FIG. 10 is a view of the front face of the scarfing oxygen nozzle orifices used in the scarfing units shown in FIG. 9.

FIG. 11 is a top view of FIG. 9 illustrating the manner in which the invention functions to produce a plurality of instantaneously started spot scarfing cuts in a single pass over the full width of the workpiece.

DETAILED DESCRIPTION

Figure 1:
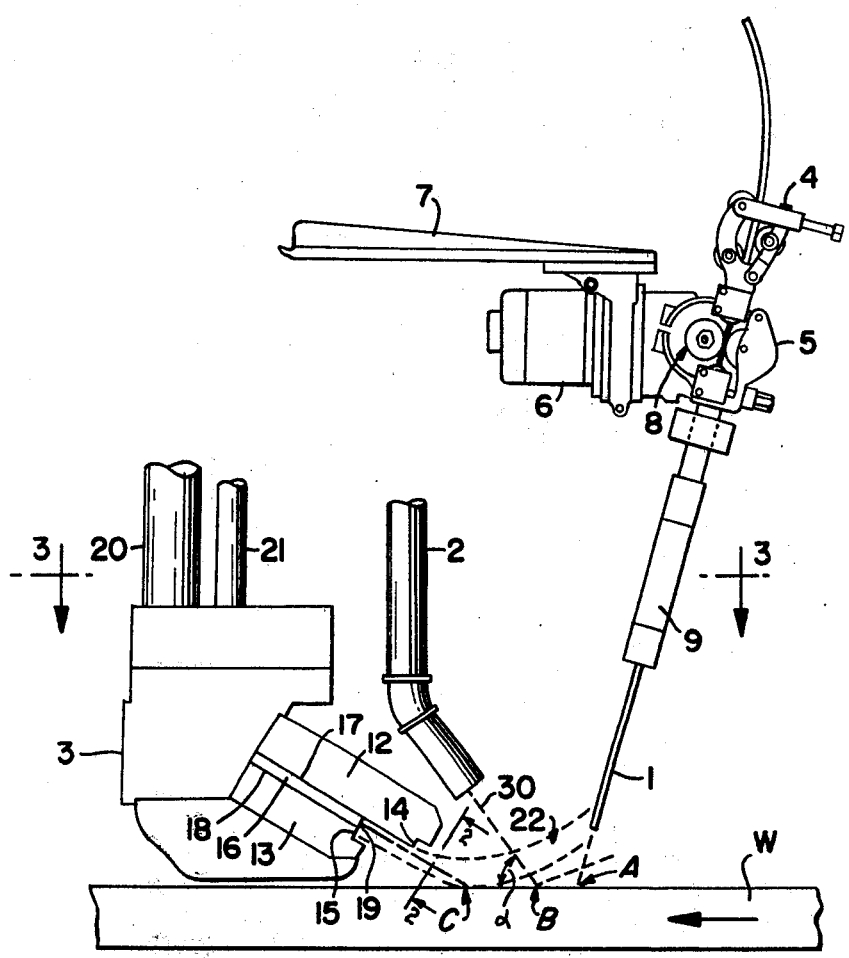
FIG. 1 is a side view illustrating the method and apparatus used for making an individual, fin-free spot scarfing cut with an instantaneous start in accordance with the present invention.
Figure 2:
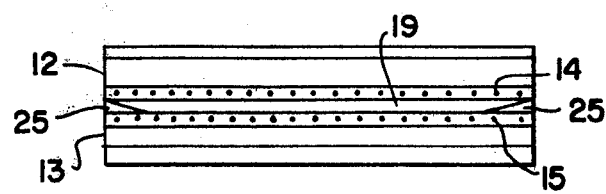
FIG. 2 is a front face view of the scarfing oxygen nozzle orifice taken along line 2—2 of FIG. 1.

In FIG. 1 the starting wire 1, which may be coiled on a spool (not shown), passes through a wire straightener 4, a wire feeder 5, and a wire guide 9, making contact on the surface of the workpiece W at the point A, the point where the spot scarfing reaction, just ahead of the defective spot, is to begin. Wire feeder 5 is fixedly attached to feeder drive motor 6, which in turn is mounted on mounting bracket 7. Wire 1 may be driven by drive wheel 8 in either the forward or reverse direction. Upon actuation of motor 6, approximately 2 inches of the wire are driven forward to contact the work surface at point A. Oxygen spreader blowpipe 2 may be a plain 1–5 cm round bore nozzle. It will produce puddles having widths of from about 5 cm to 35 cm respectively. Blowpipe 2 is inclined at its discharge end at an angle to the work surface, such that the projected centerline of the oxygen jet 30 discharged from the spreader blowpipe 2 will strike the work surface at point B, approximately 5 cm behind point A. Scarfing unit 3 is comprised of conventional upper and lower preheat blocks 12 and 13, respectively, which may be provided with a row of either premixed or post-mixed preheat flame ports 14 and 15 respectively, and suitable gas passages therein. If post-mixed preheat flames are used, and these are preferred for greatest safety, then ports 14 and 15 will be used for discharging a fuel gas which will burn upon ignition by admixture with a low velocity flow of oxygen, emanating from the scarfing oxygen nozzle slot 16 formed by the lower surface 17 of upper preheat block 12 and the upper surface 18 of the lower preheat block 13. The slot oxygen nozzle 16 terminates within discharge orifice 19. In order to produce an individual, fin-free spot scarfing cut, orifice 19 is shaped as shown in FIG. 2. Oxygen and fuel gas are supplied to the scarfing unit 3 through feed pipes 20 and 21, respectively by means well known in the art.

The apparatus shown in FIG. 1 functions as follows. First, the preheat flames emanating from scarfing unit 3 are ignited by actuating the flow of fuel gas from the rows of preheat ports 14 and 15, and a low flow of oxygen gas through orifice 19. These preheat flames, indicated by lines 22, strike the work surface and are deflected upward, so that they impinge upon and heat up the end of wire 1 to a bright red color, indicative that the wire tip is at its oxygen ignition temperature, i.e. its ignition temperature in an oxygen atmosphere. When the defective area to be scarfed out of the moving workpiece W reaches a point just ahead of point A, the wire feed motor 6 is actuated, causing the hot end of wire 1 to be driven down into firm contact with the work surface. Simultaneously, a high pressure jet of oxygen is discharged from blowpipe 2, to impinge on the hot wire in contact with the surface of the workpiece, thereby causing an instantaneous scarfing reaction to begin and a molten puddle to form on the defective spot. Wire 1 is then retracted to prevent its further melting. The oxygen jet from blowpipe 2 causes the puddle to grow to its full width very rapidly, at which time it is shut off and the scarfing oxygen stream from orifice 19 which is aimed at point C on the work surface is increased to its scarfing flow rate, to take over the reaction from the spreader jet. The scarfing oxygen flow is kept on for as long as the scarfing cut is desired.

The steps following ignition of the preheat flames discharged from scarfing unit 3 may be automated to operate through a series of sequenced timers, relays and solenoid valves, so that an operator, or other appropriate signal, will initiate and automatically carry out the sequence of steps described above. A second signal is required to end the cut by shutting off or decreasing the scarfing oxygen flow to an amount just sufficient to maintain the preheat flames on. In this state the apparatus is ready to immediately spot scarf again.

An alternative way to carry out the above steps in the process is to turn the scarfing oxygen stream on at the same time as the spreader jet. The latter, having much more impact will control the course of the thermochemical operation, i.e. will cause the puddle to form and spread. Then, as the spreader jet is shut off, the scarfing oxygen flow will "take over" the reaction in a very gradual and even, though rapid, manner.

FIG. 2 shows the scarfing nozzle orifice 19 used in the scarfing unit of FIG. 1 for producing an individual, fin-free scarfing cut. Other types of scarfing nozzles useful in the present invention are described in detail in my above-mentioned copending application Ser. No. 607,888 filed Aug. 26, 1975. It is important to note that a critical parameter of such a nozzle is that the cut it produces is narrower than the width of the nozzle itself. This is necessary in order to obtain a fin-free spot scarfing cut. This fact, however, prevents such nozzles from being used side-by-side with another such nozzle, because the parallel cuts which they produce would leave an unscarfed surface between the cuts. Hence, such nozzles are useful only for making individual fin-free cuts. FIG. 2 which is a view of FIG. 1 along line 2—2 shows the upper and lower preheat blocks 12 and 13, containing the rows of upper and lower preheat fuel gas ports 14 and 15 respectively. The oxygen nozzle orifice 19 contains triangular inserts 25 at each end of orifice 19, thereby causing the edges of the oxygen stream emanating from the orifice 19 to be gradually less intense, i.e. to have less impact on the work surface.

It is to be noted that while the distance in FIG. 1 between points A and B is about 5 cm, this distance may vary from about 1 cm to 15 cm, preferably it is kept between 5 and 10 cm. The optimum distance between points A and B depends upon the angle $\alpha$ at which the oxygen jet is directed at the work surface; the greater the angle, the smaller the distance between the points. The angle $\alpha$ may vary from about 30° to 80°; the preferred angle is between 50° and 60°. If the angle $\alpha$ of the jet is 30°, the distance should be the maximum, about 15 cm, while if it is 80°, the minimum 1 cm distance should be used. However, the points A and B must not lie on top of each other, that is, the projection 30 should not intersect the projection of wire 1 to meet on the surface of the workpiece, since this will prevent the instantaneous start from taking place. Point C should be slightly behind point B, i.e. more specifically, about 0 to 15 cm. behind point B.

FIGS. 3–6 are sketches illustrating how instantaneous or flying starts, made in accordance with this invention, take place. It is important to bear in mind that the sequence of steps illustrated in FIGS. 3–6 represent the reactions which take place in about 1½ seconds.

Figure 3:
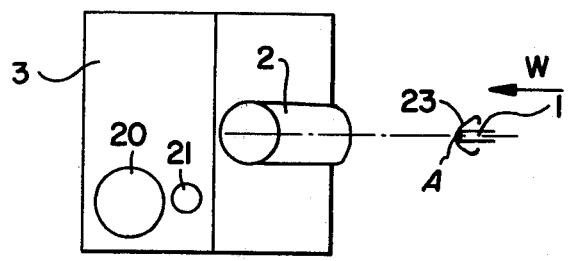
FIGS. 3, 4, 5 and 6 are schematic illustrations of the sequence of reactions, viewed from above along line 3—3 of FIG. 1, which takes place on the workpiece as an instantaneous start is made in accordance with the present invention.

FIG. 3 shows the time when the end of the hot wire 1 has made contact with point A, just ahead of the defect spot on the moving work surface. The arrow indicates the direction in which the workpiece W is traveling at a speed of about 15 meters/min. Simultaneously, oxygen from spreader blowpipe 2 causes ignition of the hot end of the wire in contact with the surface of the workpiece. This in turn melts the area 23 surrounding point A. The instantaneous start has begun.

Figure 4:
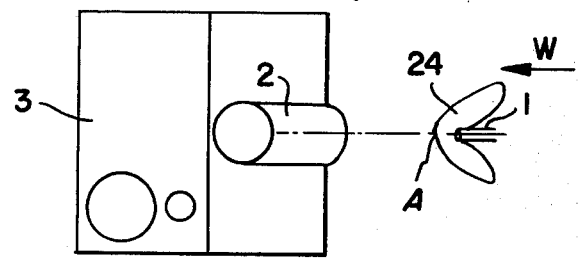

FIG. 4 shows the same area about one-half second later than FIG. 3. As the steel workpiece continues to move in the direction of the arrow, the molten puddle 24 begins to be spread by the action of the oxygen spreader jet 2 in a fan-like shape.

Figure 5:
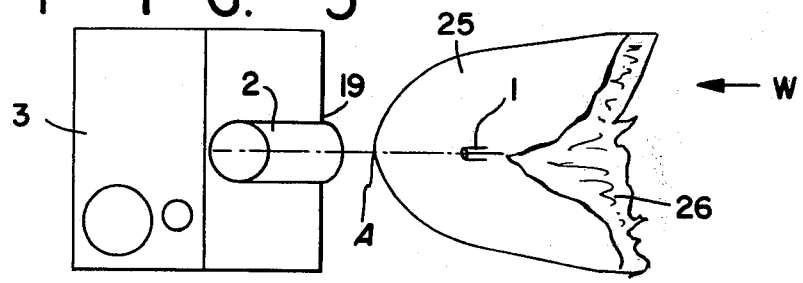

FIG. 5 represents the defective area approximately 1 second later than FIG. 3. Area 25 shows the molten puddle which has been spread on the moving workpiece W by the continuous discharge of oxygen from the spreader blowpipe 2. The starting wire 1 has now been retracted. With the puddle having been spread to its maximum width of about 25 cm, the oxygen from blowpipe 2 is now shut off, and the scarfing oxygen flow rate from scarfing unit 3 is increased to "take over" the scarfing reaction. The scarfing oxygen stream having picked up the puddle, continues the scarfing cut in the area 26. Area 26 contains both molten metal and slag on top of unscarfed steel and is clearly distinguishable from the all molten puddle area 25.

Figure 6:
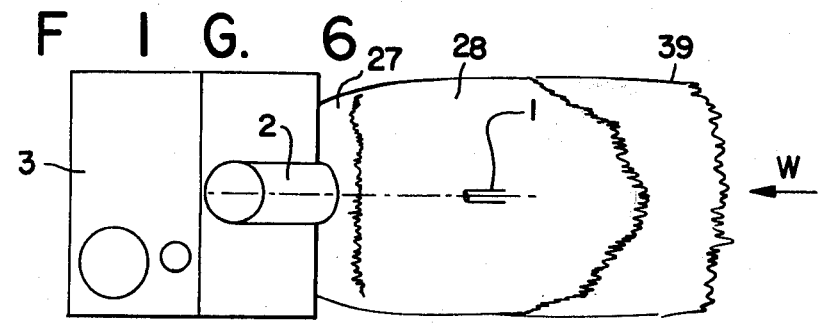

The manner in which the reaction proceeds can be seen from FIG. 6, which represents the reaction about 1½ seconds later than FIG. 3. Area 27 has been scarfed, area 28 is molten but scarfing has not yet taken place, and area 29 contains a mixture of slag and molten metal on top of unscarfed steel. As the surface of the metal moves by under the scarfing apparatus, it goes through three clearly distinguishable stages, the first being an area of molten metal and slag on top of unscarfed steel, the second molten metal alone, and third scarfed. At the time shown in FIG. 6, the starting wire has been retracted, the spreader oxygen flow shut off and a full width scarfing cut is being made by the scarfing unit 3. It is important to note that the width of the cut from scarfing nozzle is the same as the width to which the spreader blowpipe 2 has spread the puddle. This is important in order to prevent fin formation.

Figure 7:
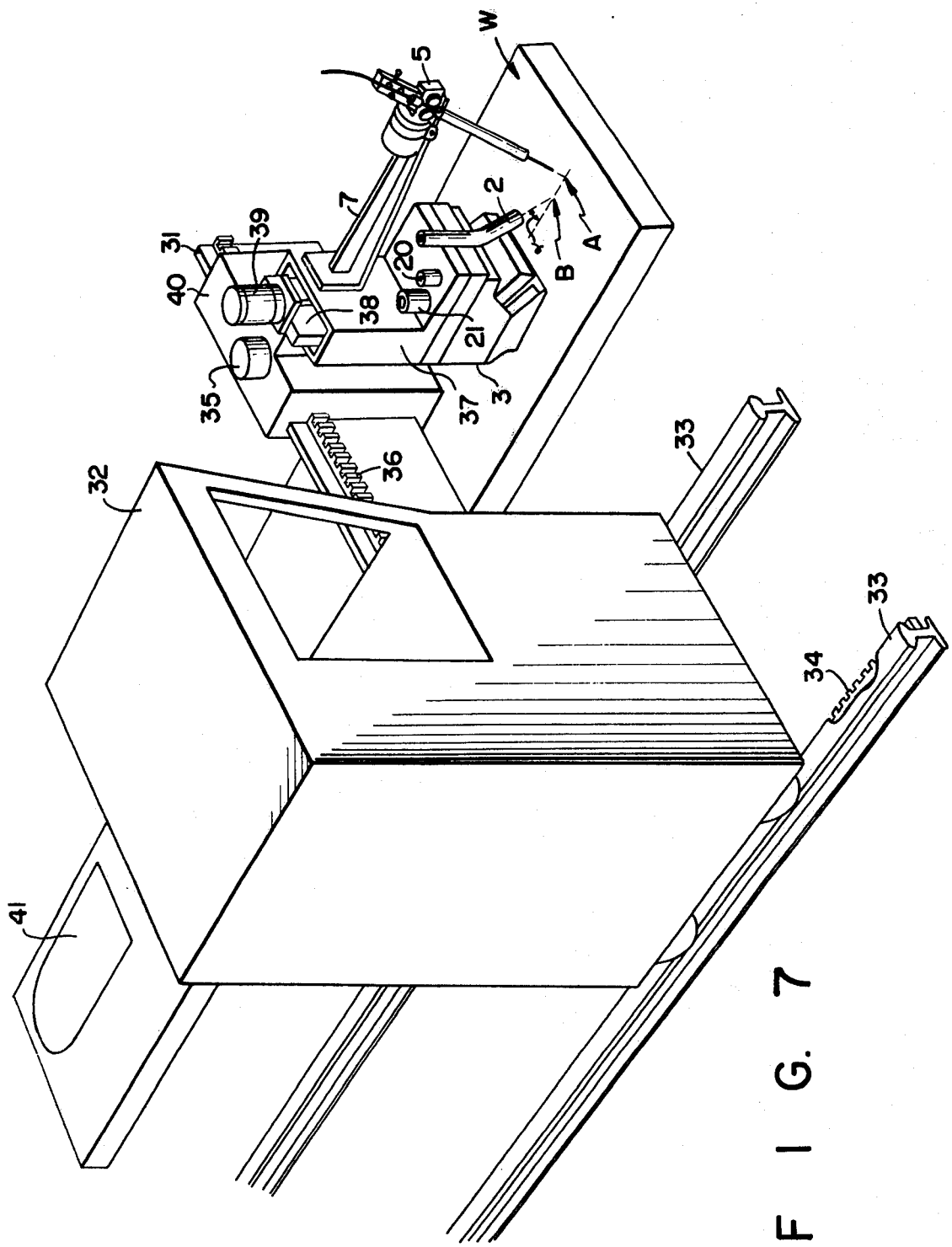
FIG. 7 shows, in perspective view, apparatus for carrying out the present invention, cantilever mounted for remote control.

FIG. 7 shows a perspective view of the apparatus of FIG. 1, cantilever mounted for purposes of making the scarfing apparatus movable both laterally across the width of the workpiece W, as well as longitudinally along its length. Horizontal frame member 31 is fixedly attached to a rail mounted operators pulpit 32. Pulpit 32 contains the controls for operation of the apparatus, including the starting wire feed mechanism 5, the oxygen discharged from the spreader blowpipe 2, as well as the oxygen and fuel gases which are supplied to scarfing unit 3 through feed pipes 20 and 21, respectively. Pulpit 32 is mobile laterally along the workpiece W on rails 33. A rack 34, fixedly attached to one of the rails, is engaged by a motor driven pinion (not shown) mounted under pulpit 32, permitting the entire cantilever mounted scarfing assembly and pulpit to be controllably moved along tracks 33. The scarfing assembly consisting of the scarfing unit 3, blowpipe 2, and wire feed mechanism 5 are all fixedly attached to carriage member 37 which rides up and down on plate 38 which in turn is fixedly attached to housing 40. Motor 39 is used to controllably raise and lower the scarfing assembly by a rack and pinion arrangement (not shown) with the rack fixedly attached to plate 38.

The scarfing assembly and housing 40 is also capable of being mechanically moved across the width of the workpiece W, by motor driven pinion 35 which engages rack 36, fixedly attached to frame 31.

The apparatus shown in FIG. 7 may be used to selectively spot scarf randomly located defects on the surface of the workpiece by being moved in line with the defect and then traveling longitudinally over the defective area. Area 40 illustrates a typical spot scarfing cut made by the apparatus shown.

Figure 8:
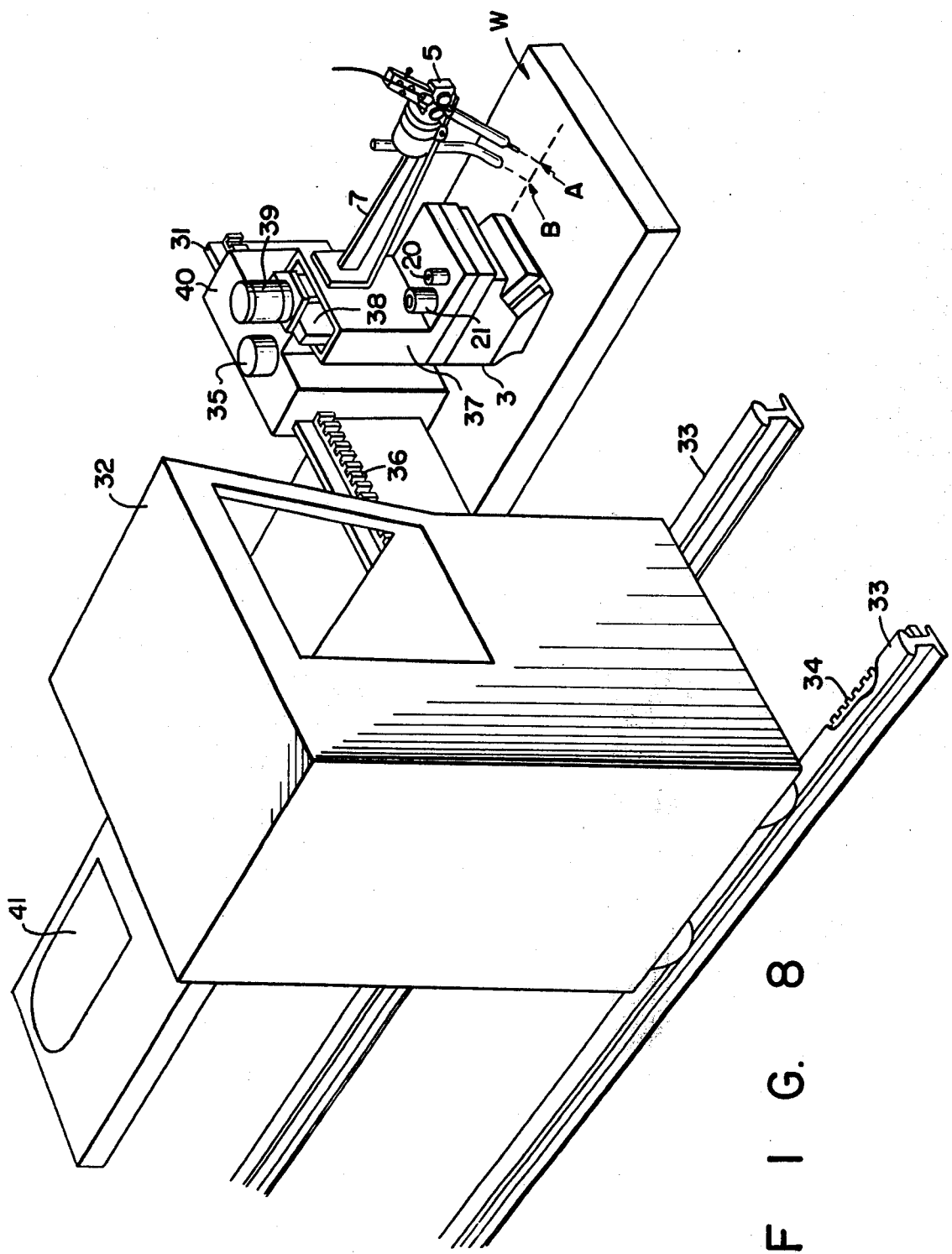
FIG. 8 shows a modified version of the apparatus shown in FIG. 7.

FIG. 8 illustrates an alternative positioning of blowpipe 2, compared to that shown in FIG. 7. In the arrangement shown in FIG. 8, blowpipe 2 is directed at point B from the right side of the workpiece W, causing the puddle to be projected toward the left side of the workpiece in front of the scarfing unit 3. This arrangement permits one to spread the starting puddle more rapidly over a wider area, enabling a wider scarfing cut to be made, than with the same sized blowpipe arrangement as shown in FIG. 7. Blowpipe 2 can, of course, also be located on the left side or anywhere in between. A combination using two such blowpipes could also be used; the arrangement of FIG. 7 to start and the arrangement of FIG. 8 to spread the puddle.

FIG. 9 illustrates, in perspective, a plurality of scarfing units provided with nozzles for performing selective, multi-cut, spot scarfing with instantaneous or flying starts of an entire width of a workpiece W in a single pass. The plurality of scarfing units 51, corresponding wire feed apparatus 52 and spreader blowpipes 53 are all fixedly mounted upon a mobile carriage 54 which rides upon gantry rails 55 and 56, respectively by rack and pinion motive means. Rails 55 and 56 are fixedly mounted upon gantry support members 57. The entire assembly of adjacent flying start scarfing units is able to pass over the full length of the workpiece W, whereby the entire width can be selectively scarfed at normal scarfing speed by the selective operation of each of the scarfing assemblies separately. Although in the apparatus illustrated in FIG. 9 the workpiece is stationary and the scarfing apparatus moves over it, it is possible and in some cases preferable to do the reverse; namely, to have a stationary scarfing apparatus under which the workpieces pass on rollers driven at normal scarfing speed.

When performing multi-cut selective spot scarfing with apparatus such as disclosed in FIG. 9, wherein two or more cuts of overlapping duration may be made, and which may be started at different times, but in which the speed of both are determined by the relative motion between the workpiece and the scarfing assembly, no pause or slow down in scarfing speed can be tolerated, from the instant a first cut is begun until the last has been completed. The reason for this is that a pause would uncontrollably affect a cut in progress by an adjacent unit. In other words, if the assembly has to be slowed down, for example, for preheating purposes as in the prior art, an adjoining assembly in which the scarfing oxygen is on, would gouge a deep hole in the workpiece. Hence, it should be apparent why no slow down may be tolerated in a multi-pass, selective, spot scarfing operation, and why the instantaneous or flying start is of such crucial importance to the proper functioning of this process.

In addition, it is essential that this process not cause scarfing cuts which either overlap the area to be scarfed by an adjacent unit, or cause fins or ridges between adjacent scarfing cuts. This requirement is satisfied by providing the "gang pass" scarfing oxygen nozzles, i.e. plurality of adjacent scarfing units with nozzles such as shown in FIG. 10.

FIG. 10 illustrates the front face of the scarfing units employed in the "gang pass" scarfing nozzles of FIG. 9. These nozzles each contain a row of upper and lower post-mixed fuel gas ports 61 and 62, respectively above and below the scarfing oxygen discharge orifice 63. Orifice 63 is typically about 0.6 cm high and 20 cm wide. Its edges are partially closed by the end wall members 64. These are typically about 3 cm along the bottom edge, 0.4 cm high (at its maximum height) and contain an inclined cut having an internal angle of about 10°. Such end wall members 64 are provided at each end of each scarfing oxygen orifice 63 in order to gradually diminish the flow of oxygen towards the edges of each unit, but without totally closing off the edge of the unit, as is done in the case of the orifice shown in FIG. 2. While orifices of the type shown in FIG. 2 create a scarfing cut on the workpiece which is narrower than the width of the orifice from which the oxygen is discharged, the "gang pass" orifice 63 of FIG. 10 produces a cut which though flared toward its outer edges, is of the same width as the orifice 63 itself. Therefore, it creates a cut which just meets the adjacent cut, without overlapping it, without causing excessively high ridges and without causing fins to be formed on the metal surface.

FIG. 11 is a top view illustrating the manner in which the apparatus shown in FIG. 10 functions to produce selective, multi-cut, spot scarfing with flying starts on a workpiece. Reference to FIG. 11 will show a plurality of adjacent scarfing units 71, 72, 73, 74 and 75, each of which contains an oxygen spreader blowpipe 76, a hot starting wire 77, and each of which is provided with oxygen and fuel gas to the scarfing unit through passages designated 78 and 79, respectively.

The areas containing defects on the surface of workpiece W to be spot scarfed out are designated 81, 82, 83, 84 and 85. As the moving gang of adjacent scarfing units comes into contact with the workpiece W, a flying start must be made by unit 74 as it reaches the front end 86 of area 84 and must remain in operation until it reaches the back end 87 of area 84, at which time unit 74 is shut off, and units 71 and 72 are started on the fly. As the gang of scarfing units passes over the workpiece, unit 72 will remain on until it reaches the back end of defective area 82 at which time it will be shut off, either by an operator or a mechanical or electrical signal, while unit 71 remains on. Unit 74 would be turned on again to begin spot scarfing the area designated 85. As the beginning of area 83 is approached by the gang of scarfing units, unit 73 is turned on, unit 74 is turned off as the end of area 85 is reached, and unit 71 is turned off as the end of area 81 is reached. Unit 73 is turned off when the end of area 83 is reached. During the entire spot scarfing pass, unit 74 remained off, since no defects were contained in the zone of the workpiece over which this particular unit passed.

What is claimed is:

1. A method for making an instantaneous thermochemical start on the surface of a ferrous metal workpiece comprising the steps of:
    a. contacting a preselected spot on said surface where the scarfing reaction is to begin, with the end of a ferrous metal wire which has been preheated to its ignition temperature in an oxygen atmosphere, and simultaneously therewith
    b. impinging a high intensity jet of oxygen gas on said surface at a point about 1 to 15 cm. behind said spot, thereby causing an instantaneous scarfing reaction to begin and a molten puddle to form at said spot, and thereafter
    c. continuing the impingement of a high intensity jet of oxygen on said puddle until said puddle has spread to a preselected width.

2. The method of claim 1 wherein relative motion between the workpiece and the means for producing said steps is caused to take place at normal scarfing speed prior to and throughout said steps without interruption, thereby producing a flying start.

3. The method of claim 1 wherein relative motion between said workpiece and the means for producing said steps is caused to commence at normal scarfing speed upon contact of said wire with said spot.

4. The method of claim 1 wherein the starting wire is preheated by flames impinged upon the end of said wire.

5. The method of claim 2 wherein the high velocity oxygen jet defined by step (b) is directed at said point from a position such that the included angle formed by the central axis of said jet and the line of travel on the work surface is between 30° and 80°, and such that the puddle is spread parallel to the direction of relative motion.

6. The method of claim 2 wherein the high velocity oxygen jet defined by step (b) is directed at said spot from a position such that the included angle formed by the central axis of said jet and the surface of the workpiece is between 30° and 80°. and such that the puddle is spread perpendicular to the direction of relative motion.

7. The method of claim 4 wherein said flames are directed against said surface and deflected upwards by said surface to impinge on said wire.

8. The method of claim 1 which in addition contains the step of
   d. scarfing said surface by impinging a sheet-like stream of scarfing oxygen on the molten puddle directed at an acute angle to said surface.

9. The method of claim 8 wherein said sheet-like stream of scarfing oxygen is gradually diminished in intensity towards the edges of said stream, reaching zero intensity at the lateral edges of the orifice from which it is discharged, thereby producing an individual, fin-free spot scarfing cut whose width is less than the width of said discharge orifice.

10. The method of claim 8 wherein said sheet-like stream of scarfing oxygen is gradually diminished in intensity towards the edges of said stream, but remaining greater than zero intensity at the lateral edges of the orifice from which it is discharged, thereby producing a fin-free spot scarfing cut which will not leave excessively high ridges or deep grooves between adjacent cuts made simultaneously and in like manner, said cut having a width equal to the width of said discharge orifice.

11. The method of claim 8 wherein said sheet-like stream of scarfing oxygen is substantially uniform in intensity across the entire width of the orifice from which it is discharged, thereby producing a conventional scarfing cut.

12. The method of claim 9 wherein the width of said cut produced is equal to or greater than the width of the started puddle.

13. The method of claim 10 wherein the width of said cut produced is equal to or greater than the width of the started puddle.

14. The method of claim 11 wherein the width of said cut produced is equal to or greater than the width of the started puddle.

* * * * *